United States Patent [19]

Neuhaus

[11] Patent Number: 5,048,319
[45] Date of Patent: Sep. 17, 1991

[54] METHOD FOR CALIBRATING AN ACCELERATION SENSOR

[75] Inventor: Dietmar Neuhaus, Duesseldorf, Fed. Rep. of Germany

[73] Assignee: Deutsche Forschungsanstalt fur Luft- und Raumfaht eV, Cologne, Fed. Rep. of Germany

[21] Appl. No.: 527,097

[22] Filed: May 22, 1990

[30] Foreign Application Priority Data

May 31, 1989 [DE] Fed. Rep. of Germany ........ 3917611

[51] Int. Cl.$^5$ .................... G01P 15/08; G01P 15/13
[52] U.S. Cl. ............................. 73/1 D; 73/1 DV; 73/517 R; 73/517 B
[58] Field of Search ............ 73/1 D, 1 DV, 517 R, 73/517 B

[56] References Cited

U.S. PATENT DOCUMENTS 4,283,952  8/1981  Newman ........................... 73/579
4,638,669  1/1987  Chou ............................. 73/517 R Primary Examiner—Hezron E. Williams
Assistant Examiner—Craig Miller
Attorney, Agent, or Firm—Spensley Horn Jubas & Lubitz

[57] ABSTRACT

The acceleration sensor has an elastic member (11) to which an inertial body (12) is attached. Upon the occurrence of an acceleration force, the elastic member (11) is deformed. In order to measure the absolute value of the acceleration, a calibration may be performed. In such calibration, a measuring value of the acceleration is obtained from the excursion of the inertial body (12) at a given density of the medium surrounding the inertial body. Subsequently, a second measuring of the same acceleration is taken at a varied density of the gas surrounding the inertial body, thereby obtaining a second measuring value. In further measurements, the absolute value of the acceleration may be calculated from the differences between the gas densities and the measured values.

8 Claims, 3 Drawing Sheets

METHOD FOR CALIBRATING AN ACCELERATION SENSOR

BACKGROUND OF THE INVENTION

1. Field of the Invention

The present invention relates to a method for calibrating an acceleration sensor.

2. Description of Related Art

Acceleration sensors are known in which the acceleration force acting on an inertial body is detected and measured. An insert body is maintained in a position of rest by an elastic organ, while the acceleration force acting thereupon tends to dislocate the inert body from its position of rest. As a rule, this principle does not suffice for precise measurements of accelerations associated with low frequency oscillations or even constant accelerations. In navigation technics, in particular in astronautics, there occurs the problem of determining very low acceleration values exactly and as absolute values. One difficulty presented is that the measured values of a calibrated acceleration sensor are valid only for a limited period of time, since the individual components of the measuring equipment tend to drift from fixed settings over an extended period of time. Generally, the elastic force constant of the elastic organ is known, so that the slope of the straight line representing the ratio between the magnitude of the measuring signal and of the prevailing acceleration is known. However, the origin of the respective coordinate system is unknown. It would be feasible for the calibration of an acceleration sensor to know the absolute value of acceleration obtained from a pair of values formed by the measured acceleration and the indicated acceleration. Knowing the absolute value, however, requires a calibrated second acceleration sensor.

The present inventor's copending U.S. patent application Ser. No. 420,554 describes an acceleration sensor that is calibrated by a controlled change of the mass of the inertial body by adding or absorbing a foreign substance. A first measurement is performed with a first mass value of the inertial body and a second measurement is performed with a second mass value. The difference between the mass values corresponds to a difference between the excursions of the inertial body. In this way, the absolute value of acceleration can be determined by two measurement. The acceleration sensor is calibrated by measuring the excursion at two different masses. The change of the mass of the inertial body requires a relatively great effort or particular materials that are capable of adsorbing or absorbing foreign substances.

It is an object of the present invention to provide a calibration method that does not impose any particular requirements to the shape or the constitution of the inertial body.

SUMMARY OF THE INVENTION

In the acceleration sensor of the present invention the mass of the inertial body is not changed, but the density of the medium surrounding the inertial body is changed. Thus, the buoyancy force caused by the inertial body at a certain acceleration is changed. This ascending force depends on the volume of the media displaced by the inertial body and on the density of the medium. The greater the acceleration, the greater the difference in the ascending force between the two states with different medium densities. In the method of the present invention, the acceleration b may be determined by the relationship:

$$b = -k \cdot \Delta x / V \cdot \Delta p$$

wherein k is the force constant of the elastic system, $\Delta x$ is the difference between the excursions of the inertial body in the two measurements, V is the volume of the inertial body and $\Delta p$ is the difference between the medium densities in the two measurements. In this way, it is possible to calibrate the acceleration sensor by measuring the excursion x at the same prevailing acceleration and with different medium densities, in order to determine the origin of the coordinate system through which the straight line characterizing the dependence between b and x passes, the force constant k of the elastic system being known.

The excursion x of the inertial body can be determined in different ways, e.g. optically or capacitively. An acceleration sensor suited for a particularly exact determination of the excursion will be described hereafter.

The density of the medium surrounding the inertial body may be changed by changing the pressure of the medium in the chamber surrounding the inertial body, or by introducing different media, e.g. gases, into this chamber. The change in density is performed with time constants in the range of seconds so that the acceleration sensor is particularly suited for determining accelerations associated with low frequency oscillations or constant accelerations.

The acceleration sensor may be used to measure acceleration on the ground, where the acceleration g due to gravity prevails generally, or to measure accelerations in micro-gravity space. In any case, a highly accurate calibration is possible so that the absolute value of the acceleration can be determined with high accuracy.

BRIEF DESCRIPTION OF THE DRAWINGS

The following is a detailed description of embodiments of the present invention with reference to the accompanying drawings.

In the Figures

DESCRIPTION OF THE PREFERRED EMBODIMENTS

Figure 1:
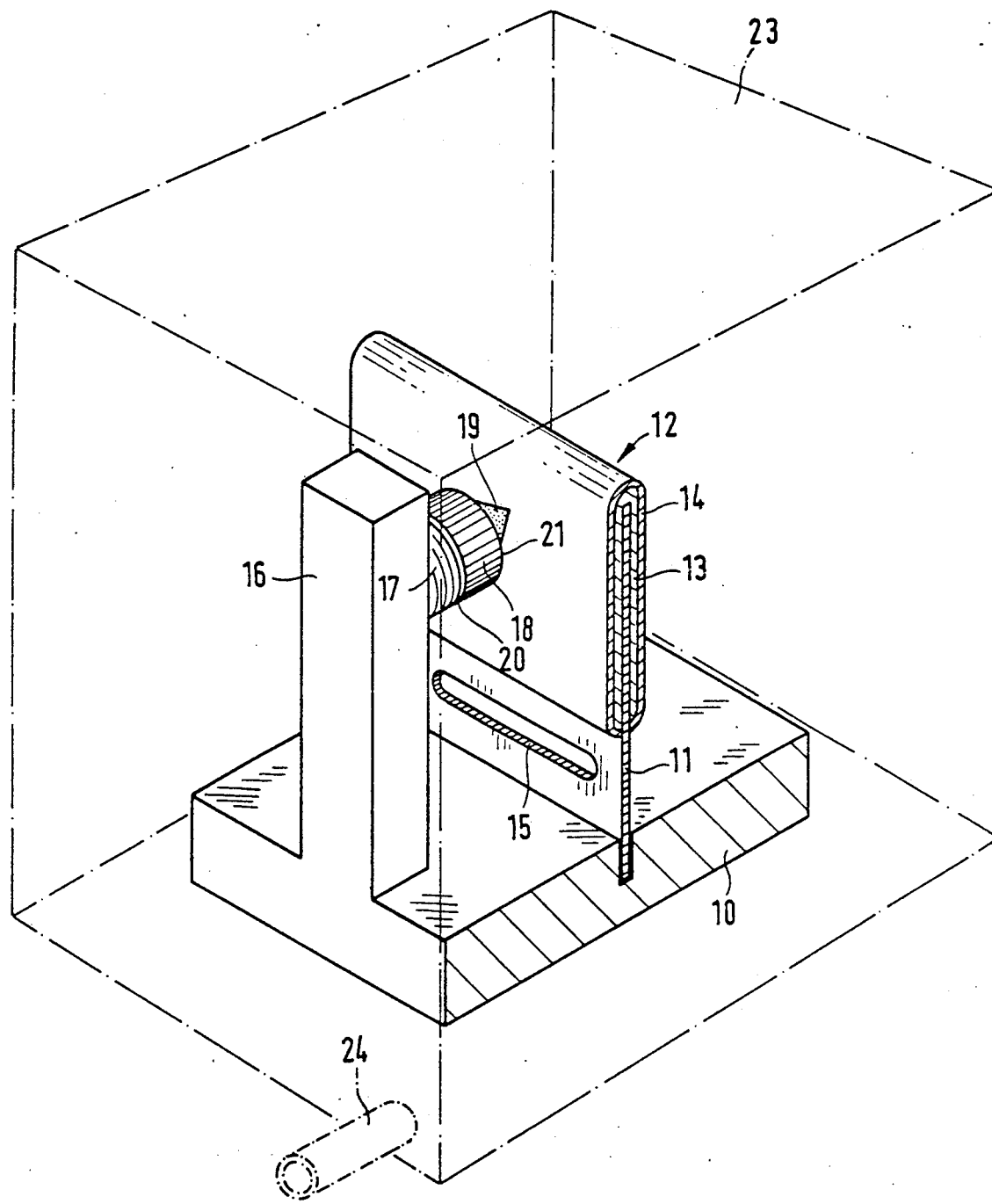
FIG. 1 is a schematic illustration of the mechanic construction of an acceleration sensor.

According to FIG. 1, the acceleration sensor has a base 10 at which one end of the elastic member 11 is clamped. The elastic member 11 consists of a thin silicon plate. Silicon is particularly suitable for the elastic member since it has an elasticity constant which is known exactly and since it can be produced with high accuracy in the desired dimensions, e.g. by etching.

The inertial body 12 is mounted at the upper end of the elastic member 11. This inertial body 12 consists of a body 13 and a coating 14 surrounding the body for providing the required surface quality of the inertial body 12.

The configuration of the elastic member 11 as a plate was selected so that the acceleration sensor will selectively determine the acceleration component in a very specific predetermined spatial direction. This acceleration component is rectangular to the plane of the elastic element 11 which is designed as a flexural bending member. In order to obtain a desired elasticity constant, the plate of the elastic member 11 may have openings 15 provided in the portion between the point of clamping at the base 10 and the mass 12.

A support 16 projects from the base 10 at which a moving means 18 for a tip 19 is fastened, with an insulator 17 therebetween. This moving means 18 consists of a piezoelectric crystal, the opposing front sides of which are provided with electrodes 20, 21. With an insulation 22 interposed therebetween, the tip 19 is mounted at the electrode 21 such that it is directed towards the lateral surface of the inertial body 12.

If an acceleration force acts on the inertial body 12 in a direction transversal to the surface of the elastic member 11, the elastic member 11 will act as a bending member, i.e. it will be bent such that the inertial body 12 is moved either towards or away from the tip 19. The acceleration sensor is highly directionally selective. In order to determine the acceleration in the other two spatial directions, respective similar acceleration sensors may be provided, each of them having an elastic member arranged rectangularly to the elastic member 11.

The entire acceleration sensor is accomodated in a pressure sealed casing 23 into which a pipe 24 opens that is connected to a gas supply.

Figure 2:
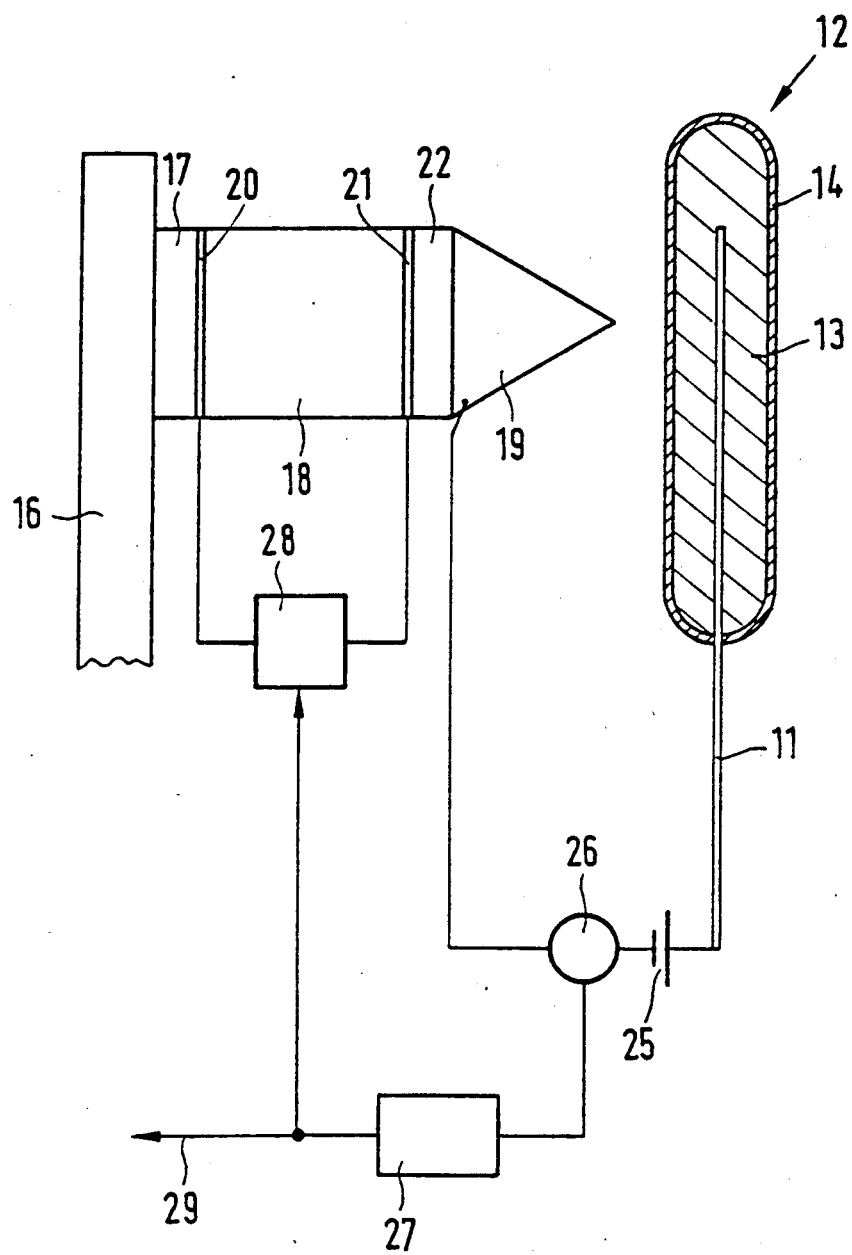
FIG. 2 is a control diagram of a sensor.

The following is a detailed description of the basic mode of operation of the acceleration sensor with reference to FIG. 2: The tip 19 is disposed at a short distance from the inertial body. This distance amounts to several $10^{-10}$m. One terminal of a current source 25 is connected to the elastic member 11 and, via this elastic element, to the electrically conductive inertial body 12. The other terminal of the current source 25 is connected to the electrically conductive tip 19 via a current meter 26. The current source 25, having a voltage of 6 V, generates a tunnel current between the tip 19 and the inertial body 12, the magnitude of which is measured by the current meter 26. The output signal from the current meter 26 is supplied to a controller 27 controlling a high voltage supply 28. The output lines of the high voltage supply 28 are connected to the electrodes 20 and 21 at both ends of the moving means 18. Since this moving means 18 is a piezoelectric crystal, it will vary in length in dependence upon the magnitude of the high voltage present at its ends. The controller 27 varies the length of the moving means 18 such that the tunnel current between the tip 19 and the inertial body 12 remains constant. Thus, also the distance between the tip 19 and the inertial body remains constant, i.e. the tip 19 follows the movement of the inertial body 12 at a constant distance. The output signal from the controller 27 forms the measuring signal that is proportional to the excursion of the inertial body 12 from its neutral position.

In order to calibrate the acceleration sensor, a measurement is taken with an acceleration force, at first unknown, acting on the inertial body 12, an output signal being obtained at the output line 29. This measuring is taken while a low as density prevails in the chamber 23. To this end, the gas pressure in the casing 23 is reduced. After that, the gas pressure and thus the gas density in the casing 23 is increased via the inlet 24, until a predetermined gas density is obtained. Then, a second measurement is taken with the same acceleration prevailing. Due to the increased buoyancy force of the inertial body 12, the second measurement shows a lesser excursion of the inertial body from its neutral position than measured in the first measurement. Consequently, the signal on output line 29 is decreased. The two measurements with different buoyancy forces counteracting the acceleration force, and the different signals on the output line 29 obtained thereby, allow the determination of the proportionality between the output signal and the mass, thereby calculating the proportionality between the output signal and the absolute acceleration. In this way, the calibration of the acceleration sensor is achieved.

Subsequent to the calibration, acceleration measurements may be performed for a long period of time, using either a lesser gas density or a higher gas density. Being able to discharge the gas from the casing 23, provides the possibility of performing any optional number of calibration cycles.

Figure 3:
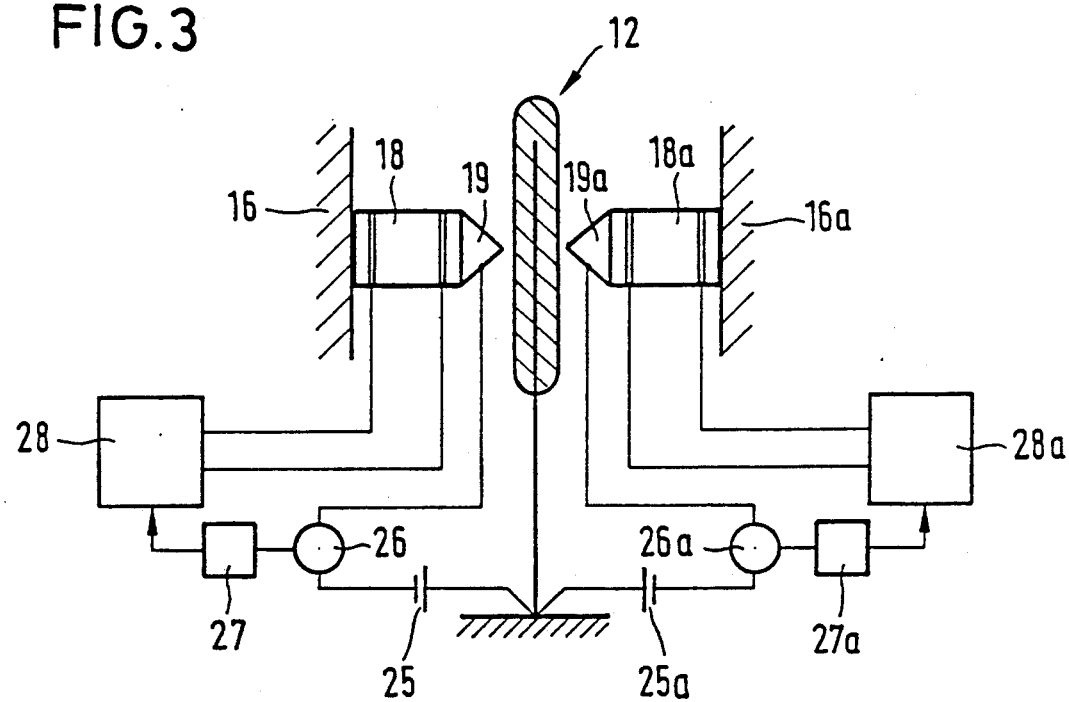
FIG. 3 is an embodiment with one sensor on each side of an inertial body, opposite the other, for compensating such changes in the tunnel current as are caused by the changes in density.

In the embodiment of FIG. 3, a further sensor is arranged in addition to the sensor described above. The tip 19 of the first sensor is disposed on one side of the inertial body 12, while the additional sensor is provided on the opposite side, the components if the latter sensor being similar to those of the former and being represented by the same reference numerals with an "a" added thereto. Upon an excursion of the inertial body from its neutral position to one side, one of the moving means 18 or 18a will be shortened, while the opposite moving means will be extended. The variant of FIG. 3 is feasible in such cases when the tunnel current between the tip 19 and the inertial body 12 is varied by the gas pressure alone, or when contaminations on the surface of the inertial body 12 cause a variation of the tunnel current. Both controllers 27 and 27a are interconnected such that their output signals are subtracted. Normally, the output signals of the controllers 27 and 27a are equal in value and differ in sign so that a subtraction of these output signals will result in the value 0 when the inertial body 12 is in its central position. The difference between the output signals of the controllers 27, 27a is other than 0, if the inertial body 12 is in a state of excursion. Thus, this difference is employed as the measuring signal.

In the above embodiments, the inertial body carried by the elastic member is freely movable. However, one may contemplate an embodiment in which a restoring means acts on the inertial body such that the same is maintained in one position for all acceleration forces acting thereupon. In this case, that force may be employed for measuring the acceleration, which is exerted by the restoring means in order to maintain the inertial body in the predetermined position. In this case, the sensor serves to regulate the force of the restoring means.

I claim:

1. A method for determining absolute acceleration, the method comprising the steps of:
   providing an acceleration sensor having an inertial body attached to an elastic member and a sensor for detecting the position of the inertial body,
   varying the density of a medium surrounding the inertial body, and
   calculating the absolute acceleration based upon the excursions of the inertial body at different densities of the medium.

2. An acceleration sensor for calculating an absolute acceleration based upon excursions of an inertial body at different densities of a medium surrounding the inertial body, the acceleration sensor comprising:
- an inertial body attached to an elastic member,
- a sensor for detecting the position of the inertial body,
- a pressure sealed casing for accommodating the inertial body together with the elastic member and the sensor, means for varying the density of the medium surrounding inertial body
- the sensor having a tip directed towards the inertial body, via which tip a tunnel current flows to the inertial body, the tip being movable towards the inertial body, and
- a moving means for moving the tip, the moving means being controlled such that the distance between the tip and the inertial body remains constant.

3. The acceleration sensor of claim 2, comprising:
- two sensors arranged on either side of the inertial body, each sensor producing an output signal, and
- means for deriving a measuring signal from the difference between the output signals of both sensors.

4. A method for determining absolute acceleration, the method comprising the steps of:
- providing an inertial body attached to an elastic member,
- providing a sensor for detecting the position of the inertial body,
- surrounding the inertial body with a medium having a density,
- varying the density of the medium surrounding the inertial body,
- measuring excursions of the inertial body at different densities of the medium, and
- calculating an absolute acceleration based upon the measured excursions of the inertial body at different densities of the medium.

5. A device for determining absolute acceleration, comprising:
- an inertial body attached to an elastic member,
- a sensor for detecting the position of the inertial body,
- means for surrounding the inertial body with a medium having a density,
- means for varying the density of the medium surrounding the inertial body,
- means for measuring excursions of the inertial body at different densities of the medium, and
- means for calculating an absolute acceleration based upon the measured excursions of the inertial body at different densities of the medium.

6. A device for determining absolute acceleration, comprising:
- an inertial body attached to an elastic member,
- a sensor for detecting the position of the inertial body,
- means for surrounding the inertial body with a medium having a density,
- means for varying the density of the medium surrounding the inertial body, and
- means for measuring excursions of the inertial body at different densities of the medium,
- whereby an absolute acceleration is calculated based upon the measured excursions of the inertial body at different densities of the medium.

7. A device as in claim 6, comprising
- a tip associated with the sensor and spaced from the inertial body, and
- means for maintaining a substantially constant distance between the tip and the inertial body.

8. A device for determining absolute acceleration, comprising:
- an inertial body attached to an elastic member,
- at least two sensors for detecting the position of the inertial body, each of the sensors generating an output signal,
- means for measuring differences between the output signals of the sensors,
- means for surrounding the inertial body with a medium having a density,
- means for varying the density of the medium surrounding the inertial body, and
- means for measuring excursions of the inertial body at different densities of the medium,
- whereby an absolute acceleration is calculated based upon the measured excursions of the inertial body at different densities of the medium.

* * * * *